I. JOYNER.
HORSE-POWER.
No. 183,572. Patented Oct. 24, 1876.
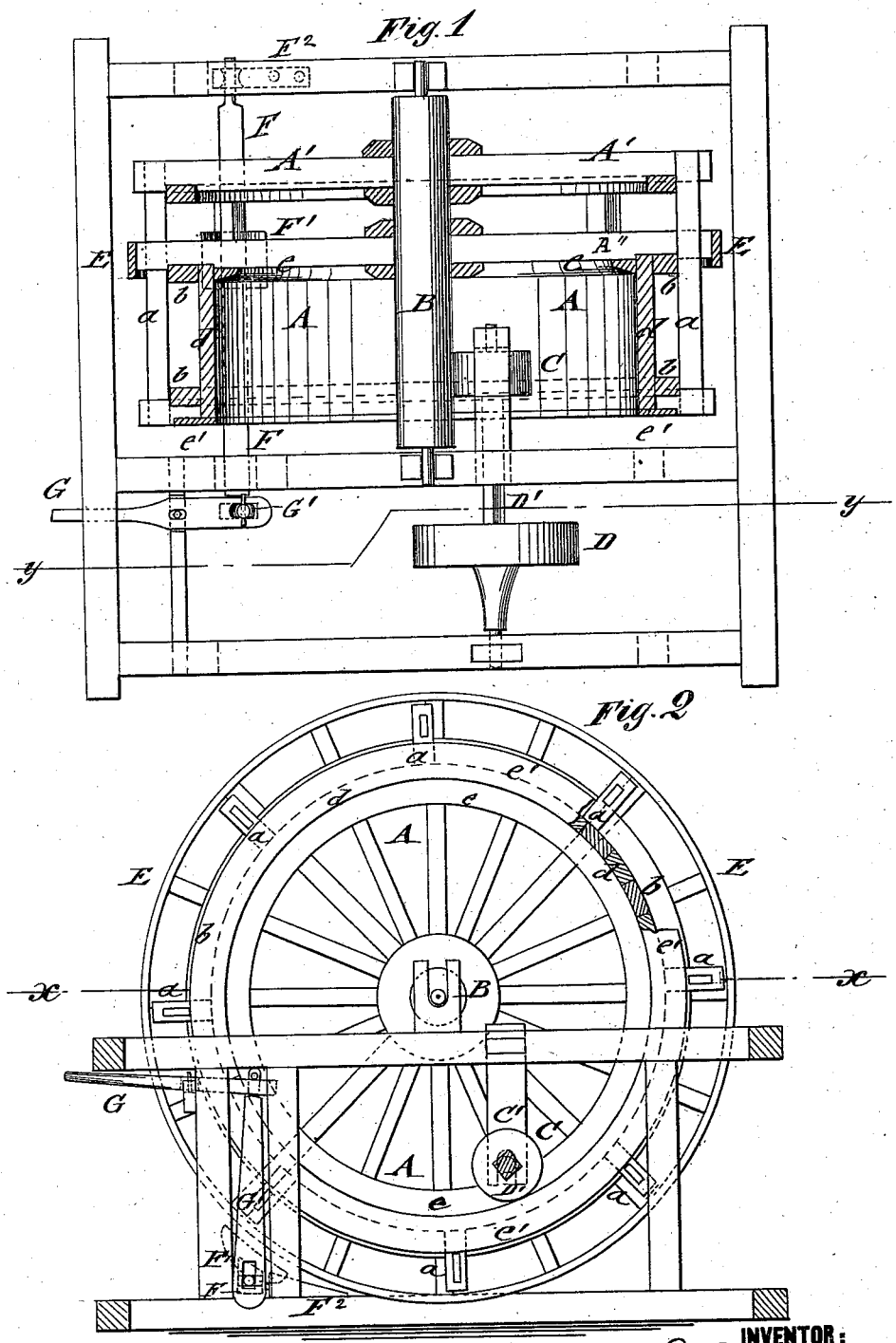
WITNESSES:
A. W. Almqvist
John Goethals
INVENTOR:
I. Joyner
BY
ATTORNEYS.

UNITED STATES PATENT OFFICE.

ISAAC JOYNER, OF JONESBOROUGH, MISSISSIPPI.

IMPROVEMENT IN HORSE-POWERS.

Specification forming part of Letters Patent No. 183,572, dated October 24, 1876; application filed September 22, 1876.

*To all whom it may concern:*

Be it known that I, ISAAC JOYNER, of Jonesborough, county of Tippah and State of Mississippi, have invented a new and useful Improvement in Horse-Power, of which the following is a specification:

In the accompanying drawing, Figure 1 represents a horizontal section on line $x\,x$, Fig. 2; and Fig. 2 a side elevation, partly taken in section, on line $y\,y$, Fig. 1.

Similar letters of reference indicate corresponding parts.

The invention relates to improvements in horse-powers, by which the power is fully controlled and transmitted with little loss, for running machinery of all kinds; and the invention consists of a wheel with spider-frames that support an interior drum or cylinder, of sufficient size for the horse to walk in, the power being transmitted by a friction-wheel, in contact therewith. One of the radial frames supports an outermost circle that forms, with suitable levers and friction-shoe, an effective brake mechanism.

In the drawing, A represents a wheel, constructed of two parallel spider-frames, $A'\,A''$, whose radial arms are rigidly mounted to hubs of a shaft, B. The shaft B turns in bearings of a strong supporting-frame, of any suitable construction. The spider-frames $A'$ $A''$ are connected, at the ends of their arms, by lateral pieces $a$, that are extended beyond one spider-frame to such length as to support ring-shaped frames $b$, one being attached to the arms of the spider-frame, and to the lateral pieces, while the other is applied to the front ends of said pieces. These ring-shaped frames $b$ support closely said lateral strips $d$, of sufficient thickness to form a drum or cylinder of such diameter that one or two horses may readily walk in the same.

The interior drum-pieces $d$ are additionally stiffened by an interior braceway, $e$, and a face-ring, $e'$.

A friction pulley or wheel, C, is supported in bearings $C'$, hung to the main frame in such a manner that it forms an intimate contact with the inner surface of the cylinder back of working horse or horses, and transmits the power by a shaft, $D'$, wheel D, and suitable belting to the machine, mill, or apparatus to be driven.

The central spider-frame $A''$, intermediately between drum and outer spider-frame $A'$, is encircled by a circumferential wheel or band, E, of wood or other suitable material, against which a brake-shoe, $F^1$, attached to a lateral cross-rod, F, is pressed by means of an upright lifting-lever rod, $G'$, and an operating hand-lever, G.

The cross-rod F is hung by a pin, at one end, to the slotted lower end of lever-rod $G'$, and supported in a guide-bearing, $F^2$, at the opposite end.

By pressing the lever G the brake-shoe is raised, and brought to bear against the circumferential brake-wheel or band E; so that in this manner the speed may be regulated, and, if desired, entirely interrupted at the will of the operator.

In this manner a strong, simple, and conveniently-controlled horse-power, for various purposes, is obtained.

Having thus described my invention, I claim as new and desire to secure by Letters Patent—

1. A drum or cylinder for horse-powers, constructed of supporting spider-frames, with outer lateral brace-pieces carrying the drum-frame, substantially in the manner and for the purpose set forth.

2. The combination of a drum or cylinder, at the inside of supporting spider-frames and outer brace-pieces, with a friction pulley or wheel, brought in contact therewith, and being mounted on the driving-shaft, substantially as herein specified.

3. A circumferential band or wheel, E, mounted around the spider-frame $A'$, in combination with brake-shoe $F^1$, and operating lever mechanism, to regulate speed of wheel, substantially as herein set forth.

ISAAC JOYNER.

Witnesses:
CHARLES O. SLOVER,
JOHN HOLLIS.